United States Patent Office 2,791,581
Patented May 7, 1957

2,791,581
PROCESS FOR EXTRACTING SAPONINS FROM PLANT TISSUE

Monroe E. Wall, Oreland, and Edward S. Rothman, Philadelphia, Pa., assignors to the United States of America as represented by the Secretary of Agriculture No Drawing. Application May 1, 1956,
Serial No. 582,052

9 Claims. (Cl. 260—210.5)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This application is a continuation-in-part of our copending application of the same title, filed December 2, 1952, Serial No. 323,736, now abandoned.

This invention relates to steroidal saponins and to processes for their isolation from plant tissue containing them.

An object of this invention is to provide efficient and economical processes for extracting steroidal saponins from the plant tissues in which they are found in nature. Another object is to provide a process for the extraction of such saponins from plant tissue which avoids the use of benzene or other volatile, inflammable and poisonous hydrocarbon solvent.

Steroidal saponins are glucosides of steroidal sapogenins and occur in many plant species. The sapogenins obtainable from them by hydrolysis are useful in medical and pharmaceutical applications.

Conventional processes for recovering saponins from the plant tissues in which they are produced by nature include tedious and expensive extraction steps in which large volumes of benzene and similar hazardous hydrocarbon solvents are used.

Our present invention is an improvement on the process described in our copending application entitled "Process for Preparation of Saponins," filed September 5, 1952, Serial No. 308,174, U. S. Patent 2,715,122.

We have discovered that steroidal saponins can be economically extracted from steroidal saponin-containing fresh or dried plant tissue, particularly such tissue which is derived from the plants Agave and Yucca, and recovered in sufficient purity for most purposes by extracting the plant tissue with a hot water-miscible saponin solvent containing at least 5% water, with the remainder, if any, being a water-miscible alkanol, as for example, ethanol and isopropanol. The resulting solution is converted to an essentially aqueous solution by concentrating it, as by removing most of the alkanol, if present, to a point short of causing appreciable separation of the steroidal saponins and separating, as by filtration, any precipitated solids, as for example, insoluble fatty materials. The steroidal saponins are then extracted from the essentially aqueous solution with a water-immiscible alcohol of from 4 to 6 carbon atoms, preferably butanol, as a solvent for the steroidal saponins. Thereafter, the steroidal saponins are isolated from the resulting alcoholic solution, as for example, by adding water to the alcoholic solution, and distilling off the solvent, thus converting again to an essentially aqueous solution of partially purified saponins. When the saponins are to be recovered as such, this isolation procedure of adding water to the alcoholic solution to reconvert to the essentially aqueous solution may be omitted and the saponins recovered directly by distillation of the water-immiscible solvent, preferably in vacuo.

Usually, the saponins are to be used immediately for recovery of sapogenins, in which case the aqueous solution produced in the isolation procedure described above, that is, by adding water to the alcoholic solution and distilling off the solvent, is acidified and heated to hydrolyze the saponins; the resulting crude sapogenins are recovered and purified, suitably by the process of Wall described in his copending application entitled "Isolation of Sapogenins," filed December 2, 1952, Serial No. 323,735.

In extracting the plant tissue with the water-miscible saponin solvent, above, we prefer to use an aqueous solution of a water-miscible alkanol, though we can use pure water. The preferred alcoholic solution is 50–80% alkanol for use with dry plant material and 80–95% with fresh plant material.

In extracting the steroidal saponins from the essentially aqueous solution with the water-immiscible alcohol we prefer to use butanol but can also use any water-immiscible alcohol of 4 to 6 carbon atoms, as for instance, isobutanol, sec.-butanol, amyl alcohol, hexanol, 2-ethylbutanol, methylamyl alcohol or cyclohexanol.

EXAMPLE I

Five kilograms of dry yucca leaf meal was extracted with 25 l. of boiling 80% isopropanol—20% water. The solution was cooled, filtered and concentrated to 4 l. The essentially aqueous concentrate was filtered hot to remove precipitated fatty materials and other impurities and the precipitate was washed with hot 50% isopropanol—50% water. The combined filtrates were again concentrated to 4 l. and were extracted 4 times with butanol, 1 l. being used each time. Two liters of water were added to the combined butanol extracts and the butanol-water azeotrope was distilled to remove the butanol. The aqueous residual solution was further concentrated to 1 l.

The partially purified saponin in the aqueous solution was then hydrolyzed to sapogenin and the resulting sapogenin recovered and purified as described in the copending application of Wall mentioned above. There was thus obtained 50 g. of substantially pure sarsasapogenin.

EXAMPLE II

Forty pounds of fresh *Agave toumeyana* leaves were extracted with 40 l. of boiling 95% ethanol. The extract was then processed as described in Example I.

The partially purified saponins in the final aqueous solution were hydrolyzed as in the previous example and the final yield was 36 g. of a 50:50 mixture of substantially pure hecogenin and manogenin.

By proceeding substantially as described in the above examples, numerous steroidal saponins were isolated from a great variety of plant material. Table I, following, summarizes the plant sources and the saponins isolated in a typical group of these experiments.

Table I.—*Saponins isolated from plant sources*

| Species | Part | Saponin |
|---|---|---|
| Dioscorea spiculiflora | tuber | gentronin. |
| Do | do | correllonin. |
| Dioscorea bartlettii | do | yamonin. |
| Dioscorea composita | do | dioscin. |
| Dioscorea macrostachya | do | kryptonin. |
| Agave lecheguilla | leaf | smilonin. |
| Agave mayoensis | do | yucconin. |
| Agave toumeyana | do | heconin. |
| Do | do | manonin. |
| Do | do | gitonin. |
| Agave goldmaniana | do | 9-dehydroheconin. |
| Agave nelsonii | do | 9-dehydromanonin. |
| Chlorogalum pomeridianum | tuber | chloronin. |
| Yucca peninsularis | leaf | tigonin. |
| Yucca schidigera | do | sarsasaponin. |
| Do | do | markonin. |
| Yucca filamentosa | do | kammonin. |
| Yucca gloriosa | do | heconin. |
| Yucca whipplei | do | tigonin. |
| Yucca carnerosana | flower | samonin. |
| Manfreda sp | tuber | gitonin. |
| Digitalis purpurea | leaf | digitonin. |

We claim:

1. A process comprising extracting the steroidal saponins from steroidal saponin-containing plant tissue with a hot water-miscible saponin solvent containing at least 5% water with the remainder, if any, being a water-miscible alkanol, converting the resulting solution to an essentially aqueous solution by concentrating it sufficiently to remove most of the alkanol, if present, to a point short of causing appreciable separation of the steroidal saponins and separating any precipitated solids, extracting the steroidal saponins from the essentially aqueous solution with a water-immiscible alcohol of from 4 to 6 carbon atoms as a solvent for the said steroidal saponins, and isolating the steroidal saponins from the resulting alcoholic solution.

2. The process of claim 1 wherein the water-miscible alkanol is ethanol.

3. The process of claim 1 wherein the water-miscible alkanol is isopropanol.

4. The process of claim 1 wherein the water-immiscible alcohol is butanol.

5. The process of claim 1 wherein the water-miscible alkanol is ethanol and the water-immiscible alcohol is butanol.

6. The process of claim 1 wherein the water-miscible alkanol is isopropanol and the water-immiscible alcohol is butanol.

7. The process of claim 1 wherein the plant tissue is derived from Agave.

8. The process of claim 1 wherein the plant tissue is derived from *Agave toumeyana*.

9. The process of claim 1 wherein the plant tissue is derived from Yucca.

References Cited in the file of this patent

UNITED STATES PATENTS 2,715,122    Rothman et al. ---------- Aug. 9, 1955